United States Patent [19]  
Lange

[11] 4,176,828  
[45] Dec. 4, 1979

[54] FLAME CUTTING ARRANGEMENT

[75] Inventor: Gerhardt Lange, Frankfurt am Main, Fed. Rep. of Germany

[73] Assignee: Messer Griesheim GmbH, Frankfurt am Main, Fed. Rep. of Germany

[21] Appl. No.: 880,039

[22] Filed: Feb. 22, 1978

[30] Foreign Application Priority Data

Feb. 25, 1977 [DE] Fed. Rep. of Germany ....... 2708140

[51] Int. Cl.² .............................................. B23K 37/04
[52] U.S. Cl. .................................. 266/65; 98/115 R; 266/144
[58] Field of Search ..................... 266/48, 49, 65, 144; 98/115 R, 115 VM

[56] References Cited

U.S. PATENT DOCUMENTS 3,784,176  1/1974  Walters et al. .......................... 266/65
3,866,892  2/1975  Hooper .............................. 266/69 X

FOREIGN PATENT DOCUMENTS 2326168 12/1973 Fed. Rep. of Germany ............. 266/65
2412782 12/1974 Fed. Rep. of Germany ............. 266/65
 453271  1/1975 U.S.S.R. .................................... 266/65

Primary Examiner—Paul A. Bell  
Attorney, Agent, or Firm—Connolly and Hutz

[57] ABSTRACT

A flame cutting arrangement includes a cutting machine movable on a transverse track over the workpiece with the workpiece being mounted on a support table having feet in which are provided a suctioning arrangement for removing smoke gas.

6 Claims, 6 Drawing Figures

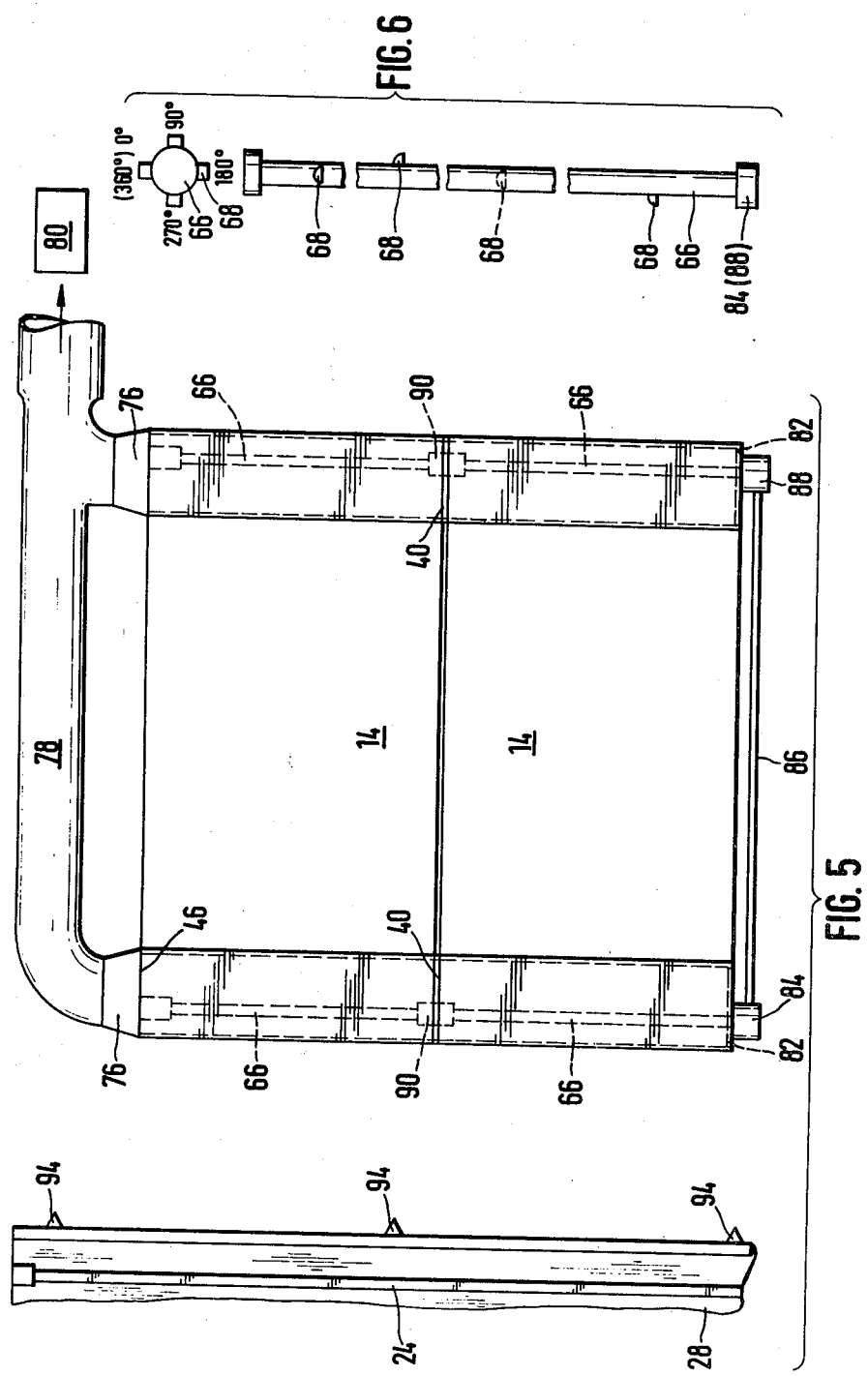

FLAME CUTTING ARRANGEMENT

BACKGROUND OF THE INVENTION

The invention is concerned with a flame cutting arrangement consisting of a flame cutting machine with a transverse track on which one or more burner carriages, which carry cutting torches, are mounted, so as to be transversely movable and with wheel boxes or drives which are longitudinally movable on longitudinal guide rails, attached on both sides of the transverse track, and also consisting of a support table, for holding the workpieces to be processed, installed underneath the transverse track and between the guide rails.

During the flame cutting process, smoke gases, which occur especially when cutting alloyed steels, result from the operation of the cutting oxygen jet. For reasons of environmental protection, it is therefore required to remove these smoke gases, immediately after their formation, from the area of the machine.

It was already proposed for this purpose, in the case of rope flame cutting machines, to suction the smoke gases from the cutting pit present underneath the roller track. (German DT-PS 1508 989). But this known arrangement is structurally restricted to a specific processing scope.

SUMMARY OF THE INVENTION

The problem of the invention is therefore, building upon the state of the art, to provide a suction system for a flame cutting machine which can be integrated into the arrangement without additional space demand.

In order to solve the above mentioned problem it is proposed according to the invention that a smoke gas suction arrangement be provided in the feet for the support table.

As a result of this installation of the arrangement within the feet extending on both sides along the length of the support table, it is assured that no unnecessary space is required and beyond that on account of the installation of the arrangement in the immediate vicinity of the formation zone of the smoke gases, that these can be suctioned away quickly and with a minimum of entrained air. This minimum of entrained air and the thereby resulting optimal smoke gas suctioning results yet also from the fact that the plates resting on the support table essentially prevent the smoke gases from escaping upward, but instead, cause them to accumulate in the interior of the support table and be suctioned off from there.

For this purpose, it is proposed that according to the invention, openings be present on the inner side of the feet which are in operational contact with the inner space of the support table that is bounded above by the workpieces.

According to a preferred form of the invention, a shield is installed on the inside of the footplate which has the openings and is adjustable by means of an adjusting mechanism.

It is hereby provided, according to the invention, that the ajdustment mechanism includes a lever fulcrumed at its one end, the other free end of which grips a cam mounted on the shield and whereby in an advantageous manner according to an additional proposal of the invention the lever can be tilted by a cam which is attached to a shaft which extends through the space of the foot.

In order to be able to optimally use a flame cutting arrangement, it is necessary to achieve a larger workpiece support. It is, hereto, proposed according to the invention, that several support tables be joined to one another in order to form a large workpiece support surface and that the shaft present at each table be connected to the neighboring shaft by means of a coupling.

By connecting the neighboring or adjacent shafts to one another, it is assured that all openings in the feet of the support tables can in an advantageous manner be opened or closed by means of the shields using a common drive for actuating all shafts.

As mentioned above, it is advantageous to suction as little as possible entrained air. In order to accomplish this only the openings of that support table are free above which the flame cutting machine happens to be located during the flame cutting process. For the control of the open-closed adjustment of the shields for the openings, according to a further concept of the invention, the cams provided for actuating the levers are mounted on the shafts so as to be staggered by a predetermined yet equal angle.

As a result of the staggered mounting of the cams with resepect to one another and to the shafts, it is always assured that only one pair of cams (two cams per table) are in contact with the corresponding levers, in other words, have swung the halter into the open position, whereas the other cams are out of contact with their respective levers, so that the openings of these other tables remain closed.

In this fashion, it is assured that the smoke gas is always suctioned off only through those openings above which the flame cutting machine happens to travel at the time, while the openings of the other tables are closed.

In order to be able to control this desired opening and closing of the smoke gas openings provided in the feet of the table, a limit switch which can be actuated by a control cam mounted on the flame cutting machine is according to an additional proposal of the invention associated with each support table.

THE DRAWINGS

FIG. 5 is a top view of the two tables connected to one another, together with suction lines; and FIG. 6 illustrates the shafts provided for controlling the shields, including the cam installation.

DETAILED DESCRIPTION

Figure 1:
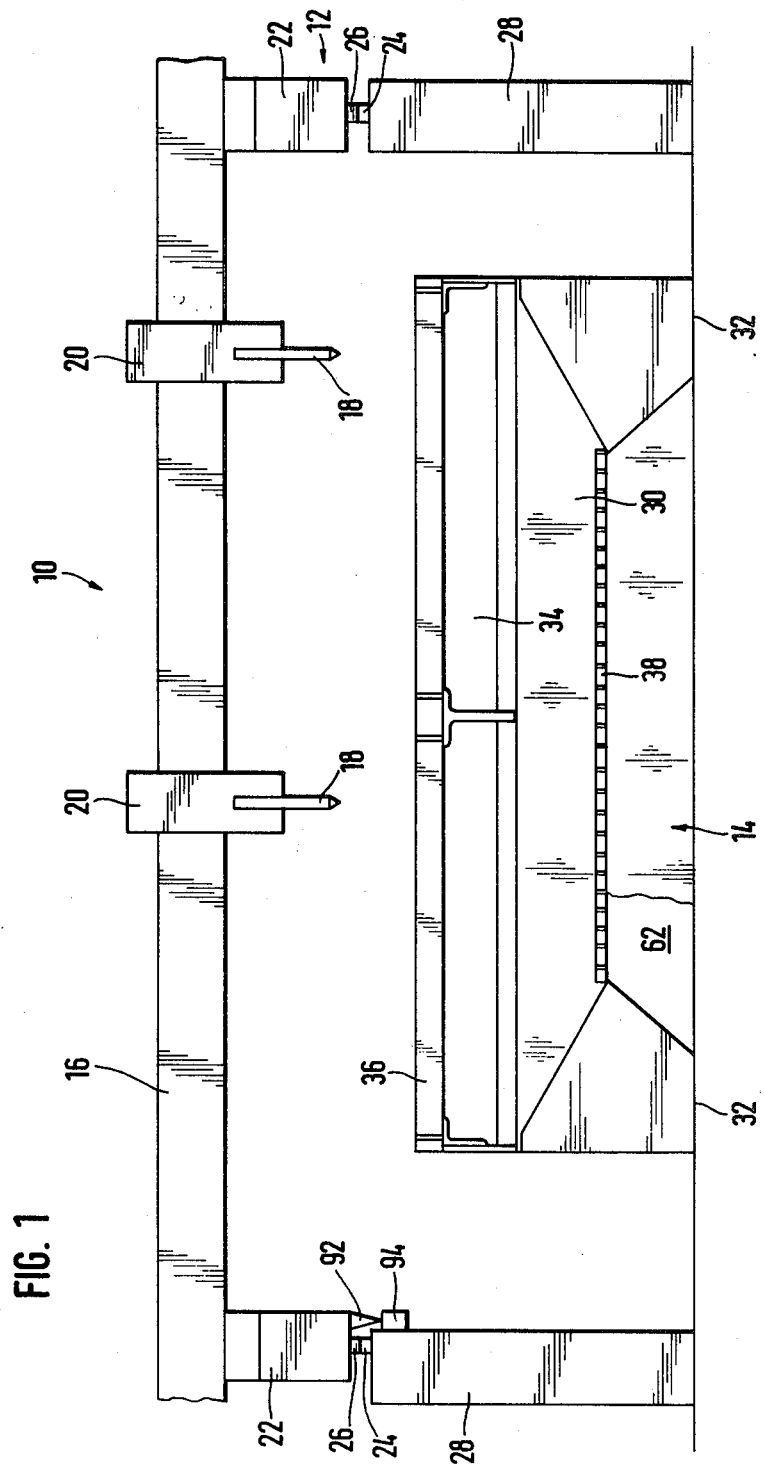
FIG. 1 is the simplified front view of a flame cutting arrangement in accordance with this invention.
Figure 2:
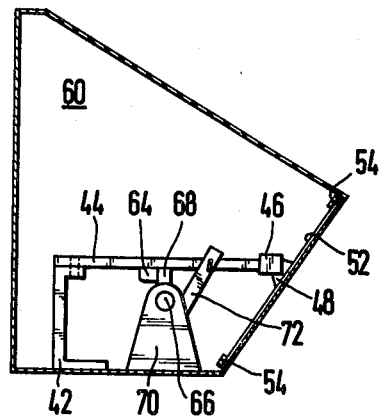
FIG. 2 is an enlarged view in section of a foot of the support table including the invention's smoke gas suctioning arrangement.
Figure 3:
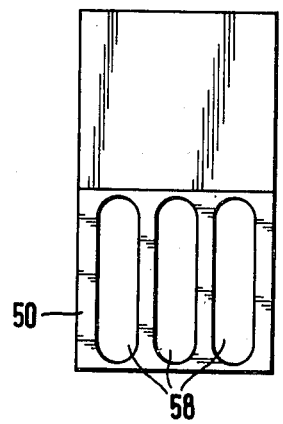
FIG. 3 is a side view from the right of FIG. 2.

A flame cutting arrangement 10 is illustrated in FIG. 1 which consists of a movable flame cutting machine 12 with which a support table 14 is associated. The flame cutting machine 12 includes a transverse track 16 extending over the table 14 on which two torch 18 carrying burner carriages 20 are mounted so as to be transversely movable. On both sides of the transverse track two wheel boxes or drives 22 are provided in which the casters 26 which ride on the guide rails 24 are mounted. The guide rails 24 are themselves attached to foundations 28.

As is apparent from FIG. 1 the support table 14 is provided underneath the flame cutting machine 12. This table consists of a box shaped supporting structure 30 on both longitudinal sides of which respectively an enclosed box-type foot 32 extending over the entire length of the table is attached.

On the supporting structure 30 an angular profile frame 34 is interchangeably set which serves as support for the workpieces 36 to be cut. Underneath this frame and carried by the supporting structure 30 a grate 38 is provided onto which the scrap generated from the flame cutting falls.

According to the invention both of the feet 32 which carry the support table 14 are designed for suctioning smoke gases. Each of the two feet is hereto structurally so designed as illustrated in the drawing of the foot marked 32 on the left side of FIG. 1 and in more detail in FIGS. 2-5.

The foot 32 is an enclosed component extending over the entire length of the table which is open only on its face 40 (FIG. 5). As is especially evident from FIGS. 2-4 there is provided in the interior of the foot 32 a mounting support 42 on the upper free end of which a lever 44 is supported in tiltable fashion. The free end of this lever forms a claw 46 (FIG. 4) which grips a shield cam 48. This cam is a component of the shield 52 adjustably mounted on the inner side of the foot plate 50 and which is guided by the strips 54.

The shield 52 which is adjustable in a horizontal plane includes several openings 56 which correspond in their shape, mutual arrangement, size and quantity to the openings 58 provided in the foot plate 50.

The openings 58 provided in the foot plate 50 of both feet 32 of a table connect the foot space 60 with the inner space 62 of the table which is bounded above by the resting workpiece 36 below by the floor and on the sides by the feet.

As mentioned above, the lever 44 held by the mounting support 42 is in operational connection with the shield 52. This lever includes a cam 64 which itself comes in contact with a lever actuating cam 68 mounted on a shaft 66. The shaft 66 extends longitudinally through the foot space 60 and is supported inside the latter, in rotatable manner by a bearing block 70.

Figure 4:
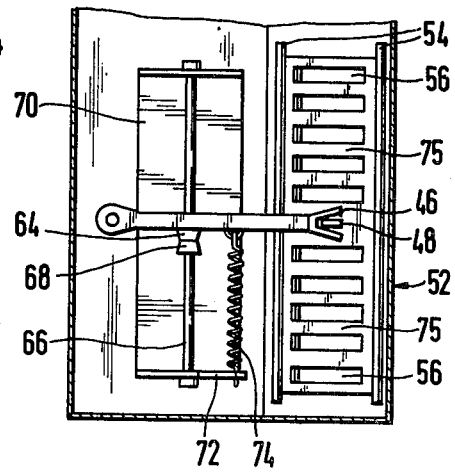
FIG. 4 is a top view in section of a portion of the foot of FIG. 2.

At the one end of the bearing block, a plate 72 protruding to the side is mounted which serves to take up a spring 74 (FIG. 4). The other end of the spring is hooked onto the lever 44. By means of the spring 74 the lever 44 is always held so that the shield 52 guided by it is in the closed position, in other words, the areas 75 present between the openings 56 of the shield 52 cover the openings 58 of the footplate 50, so that in this manner practically no entrained air can flow into the foot space 60. In this case where only one support table 14 is used two escape ducts 76 which discharge into a common duct 78 are mounted on each of the two faces (FIG. 5). This main duct ends in a smoke gas suctioning ventilator with a filter hooked up after it, from which the purified exhuast gas then flows to the outside. The ventilator-filter arrangement is illustrated in block form by reference number 80 in FIG. 5.

Both of the other faces 40 are closed in by a sealing plate 82. Each of these sealing plates has a bore through which the shaft 66 projects.

On the left end of the shaft in FIG. 5 a drive 84 is flange-mounted by means of which the shaft 66 is put in rotation. By means of a branch shaft 86 which proceeds from the drive 84 the latter is connected to an auxiliary drive 88 which is associated with the (right) shaft 66. As a result of this drive design, it is possible to move both shafts of a table 14 by means of a single motor.

It is within the framework of the invention, instead of a single table, to connect two or more tables (see FIG. 5) and still move support tables with one another in order to form a large workpiece support. The individual tables are hereby placed with their broad sides directly against each other so that the foot spaces of one blend directly and in alignment with those of the adjoining table.

The connection of the shafts with one another occurs by means of a coupling 88. The transition from one foot to the other is preferably sealed with a rubber strip or the like, so that no entrained air is sucked in. When forming a larger support, the "intermediate tables" are always put between the table exhibiting the suction duct 76, 78 and the one exhibiting the drive mechanism 84-88.

As shown in FIG. 5, a shaft 66 which slides the shield 52 is associated with each foot 32. When combining several tables together there results as well a coupling together of several shats as is illustrated by means of FIG. 6.

As is evident here, four shafts 66 with, respectively, one cam 68 each are connected into one unit. The individual shafts are turned with respect to each other so that the cams 68 carried by them are staggered by a given angle (for example, 90° in FIG. 6).

The invention's flame cutting arrangement operates as described below:

After the support tables are placed with the workpieces to be cut, the flame cutting process proper is started after correct orientation of the cutting torches. During this flame cutting operation, the flame cutting machine moves along the guide rails from its starting position to the end position. The machine arrives, thereby, with the cutting torches over the first suppport table and thereby actuates by means of a control cam 92 provided on the wheel box 22 a limit switch which is attached to the foundation in the illustrated embodiment. By means of this limit switch 94 the drive 84 is switched on and thereby turns the shaft(s) by a predetermined angle, namely so long until the cam 68 of the first shaft (in the first support table) is turned in its actuating position (0° position). During this rotation of the first cam in the 0° position, it comes in contact with the cam 64 of the lever 44 and swings the latter, against the pull of the spring 74 into its open position (counterclockwise in FIG. 4). With this swinging of the lever the shield 52 is also shifted so that its openings 56 comes over the openings 58 in the foot area 50 which were previously covered by the intermediate areas 75 of the shield 52 and in this way the foot space 60 comes into functional connection with the inner space 62 of the support table.

The smoke gases accumulating in the inner space are sucked into the box-shaped foot 32 by the filter-ventilator unit 80 and flow from it via the ducts 76, 78 to the unit 80 and from there after purification into the environment.

As long as the flame cutting machine is located over the first support table the latter's shields 52 are open and the smoke gases forming in this table are immediately suctioned off. The other, adjacent support tables are "closed" so that in this manner no entrained air is sucked in.

When the flame cutting machine then leaves the first support table and rides over the second table the control cam 92 acutates the limit switch 94 of the second support table by means of which the drive 84 is switched on again. The shafts 66 rotates by the same angle and in the same rotary direction so that the second cam (second shaft in the second support table) comes in the upper 0° position and thereby swings the lever associated with it so that the shield(s) of this second table move into the open position.

During this rotary motion the first cam 68 (first support table) loses contact with the lever 44 so that the latter with the help of the spring 74 swings back to its starting position and thereby moves the shield 52 into its closed position. Thus, only the second support table is "opened" for the suctioning of smoke gas whereas the first table and as the case may be other additional adjoining tables are "closed".

Depending upon the distribution of the parts to be cut out on the workpiece, it always happens again that a part runs, for example, over two tables this means that the cutting torches must when cutting out such a piece first leave the first support table then cut further over the second support table in a forward direction and then travel on the return path, in order to arrive at the initial cut position again, from the second table back to the first table. But since the smoke gas suctioning arrangement of the first table was closed by means of the limit switch 94 of the first table by further rotating the shaft 66 it is necessary to open it again and at the same time close the engagement of the second table.

This results in a manner of the invention from the fact that a control impulse stems from the second limit switches upon their renewed activation by means of which the drive 84, however, now turns the shaft 66 back in a counterclockwise direction by the predetermined angle, so that as a result the previous shaft position is taken up. In this fashion the smoke gas suctioning arrangement of the first table above which the cutting torches are again located is reopened.

When now after completion of the entire flame cutting operation the machine is over the last support table it is then driven back to its starting position. During this return trip, the limit switches are inactivated in advantageous manner.

This can occur by the switching off of the drive control by the attendant or automatically, since the machine travels up to a forward end position and thereby activates a control switch (not illlustrated) is activated by means of which the drive control is likewise switched off.

After the machine has returned to its starting position, it stands with its control cam 92 disengaged from the first limit switch 94 (of the first suppport table) which is activated only when the machine is again moved by a predetermined distance from its starting position.

As a result of the structure, according to the invention, of the flame cutting machine, it is possible to obtain without great space requirements an optimal suctioning of the smoke gas in the immediate vicinity of their formation. Beyond this it is guaranteed in advantageous manner that on the desired opening and closing of the shields—suction always occurs only where the smoke gases are formed. It is thereby prevented that the fraction of entrained air sucked along becomes too great.

In the illustrated embodiment both feet 32 of each table 14 are constantly designed for smoke gas suctioning. It is obvious and within the framework of the invention also to equip only one foot of each table—as directed above—for smoke gas suctioning. This is solely a question of the volume of smoke gas occuring during flame cutting.

It is furthermore within the framework of the invention instead of providing several limit switches 94 to provide a single switch (94) which is mounted on the flame cutting machine and activated by the control cams 92 (attached at the beginning of the table or at an appropriate point on the foundation) associated with the tables. In such a case, the drive 84 obtains the control impulse from the single limit switch so that the shafts 66 are steadily rotated ahead by the same angle.

What is claimed is:

1. In a flame cutting arrangement consisting of a flame cutting machine with a transverse track on which one or more burner carriages carrying cutting torches are mounted so as to be transversely movable and with drive means which are longitudinally movable on guide rails being disposed on both sides of the transverse track and with a support table for holding the workpieces to be processed and being installed underneath the transverse track and between the guide rails, the improvement being hollow feet supporting said support table, a smoke gas suctioning arrangement being provided in said feet, said feet extending along the entire length of said table, openings on the inner side of said feet for communicating with the inner space of said support table beneath the workpiece, each of said openings being closable by a shield, said shield being installed on the inside of the feet wherein said openings are located, each shield being adjustable by means of an adjusting mechanism for determining selectively its open and closed positions, said adjusting mechanism including a lever pivoted at its one end and its free end gripping a shield cam mounted on said shield, a spring resiliently urging said lever in the closed position, and said lever being mounted for being swung by a lever actuating cam which is attached to a shaft extending into said hollow feet.

2. Flame cutting arrangement according to claim 1 characterized by the fact that several of said support tables are joined to one another and form a large workpiece support surface, and each shaft in each table being connected with its adjacent shaft by means of a coupling.

3. Flame cutting arrangement according to claim 2, characterized by a common drive for actuating all of said shafts.

4. Flame cutting arrangement according to claim 2, characterized by the fact that said lever actuating cams of said connected shafts are mounted on said shafts so as to be staggered by a predetermined and equal angle.

5. Flame cutting arrangement according to claim 4, characterized by the fact that a limit switch is associated with each of said support tables, and a control cam mounted on the flame cutting machine for actuating said limit switches.

6. Flame cutting arrangement according to claim 5, characterized by the fact that each of said tables includes a duct which takes up the smoke gases sucked in through said openings, said ducts being mounted at the end of said feet away from the drive side, and said ducts being connected with a ventilator-filter unit by means of a central main duct.

* * * * *